United States Patent [19]

Graham et al.

[11] Patent Number: 4,894,274

[45] Date of Patent: Jan. 16, 1990

[54] PASTE-THE-WALL WALLCOVERINGS

[75] Inventors: Thomas Graham, Clitheroe; Philip G. Radford, Blackburn, both of England

[73] Assignee: Crown Decorative Products Limited, Derby, England

[21] Appl. No.: 217,220

[22] Filed: Jul. 11, 1988

Related U.S. Application Data

[63] Continuation-in-part of Ser. No. 215,271 and Ser. No. 215,470, July 5, 1988, abandoned.

[30] Foreign Application Priority Data

Jul. 2, 1987 [GB] United Kingdom ............... 8715533
Jul. 2, 1987 [GB] United Kingdom ............... 8715535

[51] Int. Cl.$^4$ ............................................. D06N 7/04
[52] U.S. Cl. ........................................ 428/151; 428/195; 428/211; 428/904.4; 428/906
[58] Field of Search .............. 428/151, 195, 211, 904.4, 428/906

[56] References Cited

U.S. PATENT DOCUMENTS

| | | | |
|---|---|---|---|
| 3,275,469 | 9/1966 | Streit | 428/350 |
| 3,677,980 | 7/1972 | Last | 428/904.4 |
| 3,715,264 | 2/1973 | Burton | 428/904.4 |
| 4,339,491 | 7/1982 | Lauterbach et al. | 428/317.7 |
| 4,427,731 | 1/1984 | Gibson | 428/159 |
| 4,433,025 | 2/1984 | Pusch et al. | 428/211 |
| 4,524,097 | 6/1985 | Graham | 428/141 |

FOREIGN PATENT DOCUMENTS

| | | |
|---|---|---|
| 1147116 | 5/1983 | Canada . |
| 0034791 | 7/1981 | European Pat. Off. . |
| 0098971 | 3/1984 | European Pat. Off. . |
| 0103458 | 3/1984 | European Pat. Off. . |
| 103458 | 3/1984 | European Pat. Off. . |
| 0153615 | 1/1982 | Fed. Rep. of Germany . |
| 1262277 | 2/1972 | United Kingdom . |
| 1566273 | 4/1980 | United Kingdom . |

*Primary Examiner*—Ellis P. Robinson
*Assistant Examiner*—P. J. Ryan
*Attorney, Agent, or Firm*—William R. Hinds

[57] ABSTRACT

A paste-the-wall wallcovering has a deep emboss paper ply (10a) adhered to a flat plastics ply (16) having perforations (22). The ply (16) can restrain the ply (10a) against any significant expansion in the course of hanging and paste drying. The perforations (22) are regulated on the one hand so that weight loss from the hanging paste is not so excessive that the paper ply becomes softened and, on the other hand, so low that tacking of the wallcovering to the surface on which it is to be adhered is not unduly delayed.

In making the wallcovering the paper ply is moistened and embossed and allowed to dry just below ambient humidity prior to laminating it to the plastics ply. The wallcovering may be decorated in the course of manufacture or after hanging.

17 Claims, 3 Drawing Sheets

PASTE-THE-WALL WALLCOVERINGS

Paste-the-wall wallcoverings have many advantages compared with traditional wallcoverings that are hung by pasting-the-product.

They can be hung from the roll, onto the wall, without having to wait for the paper to soak and become supple. There is no need for a pasting table, nor for careful measurement of cut lengths, with the problem of allowing for the pattern repeat, as the wallcovering can be cut to length on the wall after hanging.

The handling of a dry product is much easier, being much lighter, than a wet pasted traditional wallcovering. It avoids the necessity for careful folding and handling; and is less easily damaged than a wet wallcovering. When hanging dry direct from the roll onto the wall, there is less stretch or wet expansion to cause pattern mismatch.

With deeply embossed products, there is the additional advantage of less risk of damaging the emboss. When hanging on a ceiling these factors are especially advantageous, and the lightness of the dry wallcovering makes it easier to handle and less likely to fall off the ceiling whilst being applied. Paste-the-wall wallcovering can be made easily dry strippable as a single piece without leaving a paper backing and thus avoiding the need for wetting and scraping.

Because the paste is applied to the wall, adequate paste application at the edges can be ensured with less tendency for paste to get on the decorative front face of the product.

Despite these many advantages, paste-the-wall wallcoverings occupy a small proportion of the market because of the problems associated with making a wallcovering incorporating the above advantages. These problems are now discussed.

Traditional paper-backed wallcovering cannot be hung reliably by paste-the-wall procedure as the paper becomes wetted by the paste, after the stage of hanging, with consequential wet expansion. As the paste at this stage has not sufficient tack to hold the wallcovering flat against its tendency to expand in the width dimension, cockling and blistering occurs due to uneven wetting of the paper.

Many attempts have been made to prevent the wet expansion of the paper by including a high proportion of synthetic water-inert material in the paper or by providing a barrier such as laminating to a plastics film.

A plastic-paper laminate has a strong tendency to curl should the paper ply become wetted at any locality (especially at the edges) by the hanging paste because of the differences in wet expansion of the two plies, with a resulting difficulty in making the wallcovering stay flat after hanging.

Some wallcoverings, such as paper-backed vinyls and plastic backed papers, have been adopted or proposed but they have been unsatisfactory for paste-the-wall for the reasons above. In G.B. Pat. No. 1,262,277, which is concerned with problems of strippability, the use of a plastics layer on the back of a paper-faced wallcovering has been proposed and perforation of the plastics layer was proposed to accelerate the wetting and softening of the paper face when a paste is applied to the wallcovering. In the context of paste-the-wall (which is not discussed or intended) the wallcovering of G.B. Pat. No. 1,262,277 would, it is believed, suffer curl, cockling and blistering.

Where a deeply embossed wallcovering is required, wallcoverings incorporating synthetic material or plastic layers have suffered further limitations because paper and plastics have incompatible requirements for deep embossing. For best results paper needs to be moist when embossed whereas plastics require to be heated to above the boiling point of water in order to make the plastic mouldable. A limitation on depth of emboss is considered to be present in the wallcoverings in G.B. Pat. No. 1,262,277 and in E.U. Pat. No. 1,103,458 A1. In both of these wallcoverings the plastics ply follows the emboss of the paper ply either by extrusion of the plastic onto the paper or lamination before embossing.

Further problems occur in hanging wallcovering incorporating plastics films, or high proportions of synthetic materials, on uneven wall surfaces. For a plastics layer to restrain the paper against wet expansion, it needs to have negligible stretch, which causes difficulty in making the wallcovering conform to uneven surfaces, or in going round uneven corners.

Commercially successful paste-the-wall wallcoverings have been marketed, comprising foamed plastics sheets, with a degree of stretch allowing some ability to conform to uneven surfaces or uneven corners. But at the same time this overall stretching can cause problems with pattern mismatch in printing, or when hanging long lengths such as in a stair well. This type of wallcovering has been limited to applications where deep, sharp embossing is not a requirement, because of the difficulty of deeply embossing such a supple foamed plastic without making the wallcovering of such a thickness as to be uneconomic.

Other wallcoverings that can be hung by paste-the-wall include those made wholly of unfoamed synthetic materials or incorporating more than 30% of such materials selected from those that are inert to water, including spun-bonded, wet-laid or dry-laid non-wovens, and woven fabrics. These are limited in their application to wallcoverings not requiring a deep, sharp emboss. They are costly suffer from the problems described earlier of conforming to uneven wall surfaces, and a limited range of decorative effects.

Known paste-the-wall wallcoverings do not satisfy the requirement for depth of emboss greater than about 0.5 mm such as to have emboss effects comparable with those achievable by traditional paste-the-product wallcovering A desirable additional requirement is to be able to offer improved retention of emboss on hanging. Whilst traditional wallcovering can have deep, sharp emboss before hanging, there is a tendency to lose some of this because of wetting of the paper during hanging with consequent risk of flattening of the emboss whilst applying it to the wall with a brush.

To give improved emboss retention wallcoverings hav been proposed which incorporate a flat paper backing layer adhered to the embossed front face after embossing, as in E.U. Pat. No. 0,098,971. Although this technique gives improved emboss retention, it does not offer paste-the-wall performance because the product is made wholly of paper, thus being exposed to the problems with cockling after hanging referred to earlier.

Our present invention overcomes the problems described for paste-the-wall wallcovering, particularly with regard to the requirement for a paste-the-wall wallcovering with deep, sharp emboss and having good emboss retention after hanging, and is able to accommodate, to a better degree, uneven surfaces, such as irregular corners and lumpy surfaces. This can be very significant where a high quality of covered and decorated surface is required.

Our present invention also provides a wallcovering suited to decoration, such as with a water-based emulsion paint, after hanging. Wallcoverings with this facility are well known and usually consist of two paper plies embossed together. They do not have a paste-the-wall ability.

Wallcovering which ca be decorated after hanging has appeal in that it is not costly, in that the ultimate decorative effect it produces is primarily in the hands of the purchaser, in that it conceals defects in surfaces being covered, and in that the decorative effect can be changed or renewed without replacing the wallcovering. This appeal is so great that it tends to mask certain adverse features of the wallcovering in that difficulty can arise in some loss of emboss when pasted and hung and in obtaining a good embossing pattern match between adjacent strips of pasted wallcovering due to non-uniform stretching. The loss of emboss and stretching varies with the wetting that occurs during pasting, hanging and subsequent decoration with water-based paints. Hence, such factors as quantity of paste, wetness of paste, soak time, type and thinning of paint or emulsion materials applied and general handling when wet can all contribute to the loss of emboss and amount of stretch. Whilst these factors can be reasonably judged or accommodated to give a fairly consistent stretch by a professional decorator there is always appreciable loss of emboss and they can give rise to an amateur appearance unless considerable skill is applied.

The aspect of the invention related to decoration after hanging has its origin from the observance of the phenomenon that, with a paste-the-wall wallcovering as disclosed for example in E.P. Pat. No. 0,103,458A1 applied in adjacent strips to all the walls in a room and decorated with most matt emulsion paints ten hours approximately after hanging, some strips remained free of gaps with adjacent strips whilst others had eye-catching gaps.

From this observation it was sensed that, if the paste used for the wallcovering operation could be allowed to dry via porosity or perforation in the plastics ply up to a point where the paste locally tacked the wallcovering to the wall surface then decoration could take place regardless of wall surface, regardless of the decorative material used and regardless of whether the paste had fully dried everywhere.

The invention allows wallcoverings to be sold with the commendation that they are "paste-the-wall; dry strippable; heavily embossed; and paper faced to be capable of wetting (e.g. by emulsion paint decoration) on the paper face ten hours after hanging on any surface with good emboss retention". Such a wallcovering is thought to be of a character nowhere else achieved although clearly desirable.

The present invention provides a paste-the-wall wallcovering comprising a paper/plastics laminate in which the paper ply is embossed and the plastics laminate is flat, water vapour porous, and capable of restraining the paper ply against any significant expansion.

The present invention also provides a method of forming a paste-the-wall wallcovering capable of accommodating irregular corners and lumpy surfaces comprising
  (a) taking a paper web;
  (b) moistening it;
  (c) embossing it;
  (d) drying it to just below ambient humidity; and
  (e) laminating it to a moisture vapour permeable plastics web with an adhesive that is water-insoluble after drying, the plastics web being flat and capable of restraining the paper web against expansion with negligible stretch of the laminate.

The present invention further provides a paste-the-wall wallcovering for decoration after hanging comprising:
  (i) A paper/plastics laminate.
  (ii) The paper ply is selected to be able to take an emboss of greater than 0.5 mm depth and is embossed whilst conditioned to be moist and prior to lamination with the plastics ply.
  (iii) The plastics ply is adhered to the embossed paper ply using an adhesive that is water-insoluble after drying and the plastics ply is held nominally flat at the lamination stage to give a flat-backed laminate.
  (iv) The adherence of the plies takes place with the moisture content of the paper ply at or below normal atmospheric level to avoid the paper shrinking on drying with or after the adherence step such as to avoid puckering of the plastics ply to an extent that would inhibit the ability to restrain the paper ply against any significant wet expansion.
  (v) The plastics ply is
    (a) perforated, or otherwise made water vapour porous, such that when, as a test, a sample of the laminate is pasted to a plain glass surface with a standard paste applied to the glass at the rate of 300g/m$^2$ and the plastics ply is in contact with the paste and the pasted laminate is set aside to dry under standard conditions then:
      1. the paper ply does not transmit more moisture from the paste than 15% of the paste weight, in the first hour of drying; and, preferably no more than 10%, and
      2. when the paper ply is wetted after being set aside to dry for ten hours under the standard conditions the laminate shrinkage, on further drying, is no more than 0.2% and preferably zero, and
    (b) the plastics ply is capable of restraining the paper ply against wet expansion to not more than 0.2%

By "standard paste" we mean a proprietary starch-ether wallpapering adhesive made up as a 5.5% solution in water.

By "standard conditions" we mean a draught-free atmosphere at 20° C. and 75% relative humidity.

The test referred to in (v) above is performed on a glass surface as representing a completely impervious and form surface.

The figure of 15% above is critical in that, if the moisture loss exceeds that figure, there is a risk that the paper ply will take up so much moisture that the laminate which the sample represents will become softened such that the emboss can become easily damaged on hanging the laminate.

The period of ten hours above is chosen as representing "overnight"; that is when the laminate is being used as a paste-the-wall wallcovering on any surface it will always be safe to decorate it with any paint if left overnight after hanging without gaps appearing between adjacent hung strips. It is possible (as the examples below show) to make a wallcovering in conformance with the invention which is safe to decorate if left for four hours after hanging.

The figure of 0.2% in (2) above (which represents approximately 1 mm on a standard width wallcovering) is the largest acceptable gap between adjacent strips for a good standard of finish when covering a wall.

The figure of 0.2% in (b) above is necessary to avoid the laminate cockling or puckering when hung as a wall-covering.

The plastics ply could be a plastics film or a web incorporating at least 30% of synthetic fibres which are inert to water. Such a web could be spun-bonded, wet-laid or dried-laid non-woven, or woven. To give vapour permeability the ply could be perforated, as suggested, or selected for its porosity (such as foamed polystyrene) or both.

The plastics ply should be able to contain the paper ply's wet expansion to no more than 0.2%. This expansion is not significant in the performance or appearance of the hung wallcovering.

The wallcovering proposed has many advantages in the context of deeply embossed paste-the-wall wallcovering. Lamination after embossing to create a flat-backed wall-covering confers advantages in allowing the paper ply to be chosen for its ability to take a good sharp emboss. This processing sequence also allows the paper ply to be conditioned to a high, such as 12%, moisture content which is most favourable for embossing whilst allowing it subsequently to be conditioned to a low moisture content such as 4% during lamination to avoid puckering of the plastics ply on subsequent drying.

The flat-backed laminate gives improved emboss retention compared with a traditional wallcovering because the flat backing film locks the emboss, across the areas of adhesion.

The flat-backed laminate avoids the incompatibility described earlier between the requirements for optimum emboss with paper as compared with those for a plastic film.

It has been found that the flat plastic backing ply can be perforated, and a range of perforation hole diameters and spacings defined, to allow the hanging paste to dry without softening the embossed paper ply to an extent that causes easy loss of emboss on hanging.

Patent document E.U. Pat. No. 1,103,458A1 proposed an embossed paper/plastic laminate with lamination carried out before embossing, but, whilst this could be hung successfully by paste-the-wall, the range of plastics that could be used successfully is limited. This product also offered more limited emboss potential than our present proposal because embossing the paper and plastics together suffered from the incompatible emboss requirements of plastics compared with paper, as described earlier.

It has also been found, as mentioned above, that with wallcoverings according to E.U. Pat. No. 1,103,458A1 that gaps can occur between adjacent strips of wallcovering when the wallcovering, after hanging on low porosity or impervious surfaces, is decorated with certain emulsion paints (such as certain matt emulsion paints) too soon after hanging. This arises as the paste is in the given circumstances, slow drying. If the paste can be allowed to dry thoroughly after hanging, and then decorated, the problem of gaps occurring does not arise.

By selection of perforation size and distribution in the plastics ply in conjunction with a wallcovering having an embossed paper ply and flat plastics ply in accordance with the invention, drying of the hanging paste in the immediate vicinity of the perforations is sufficient to avoid the above mentioned gap occurrence problem by localised "pinning" of the laminate. This is achieved in a surprisingly short time so as to allow decoration soon (typically 10 hours but possibly 4 hours) after hanging.

One unexpected advantage of a wallcovering according with the present invention is its ability to conform to uneven wall surfaces, or to go round uneven corners compared with previously known unembossed or lightly embossed wallcoverings incorporating plastics layers, particularly as this plastic is chosen to be resistant to stretching so as to prevent wet expansion of the paper. This is because this laminate has an ability to absorb a degree of local distortion because of the deep emboss.

When a laminate according to the present invention is taken over a curved surface or over an external corner, the flat backing tends to pucker up into the rear recesses of the emboss, resulting in a degree of dimensional flexibility not experienced with flat laminates incorporating plastics nor laminates embossed after lamination.

In addition to allowing controlled drying of the paste the perforations have an additional advantage in increasing the adhesion of the perforated film to the wall surface compared with an unperforated film. It is common practice to treat plastic films by corona discharge treatment or other known surface treatments and this gives some ability to control adhesion to the wall. A greater contribution to control of adhesion is found to be provided if the perforations confer improved mechanical keying of the adhesive to the plastic film, with some penetration of the adhesive through the holes.

It has been found possible to establish a range of perforation sizes and spacings that allows good adhesion whilst still being compatible with the need for controlled drying of the adhesive and limited wetting of the paper ply, the importance of which was described earlier.

As this wallcovering is designed to be easily dry strippable from the wall without need for soaking and scraping, the degree of adhesion to the wall is important. The degree of adhesion can be assessed experimentally by measuring the strip force needed to pull a standard width of wallcovering off the wall. It has been found that this strip force should be in the range of 5 kg to 10 kg per metre width. Above these levels the wallcovering is prone to delamination and failure to strip completely or else to pull plaster away. Below these levels the adhesion to the wall is too low.

The invention will now be described further with reference to the accompanying drawings in which:

FIG. 1 shows diagrammatically apparatus for one way of making a wallcovering according to the invention.

FIG. 2a and 2b, which are sections, respectively compare a known embossed paper/plastics laminate wallcovering with a wallcovering according to the present invention.

FIG. 3, which is a section, shows how a wallcovering according to the invention accommodates itself to a corner.

FIG. 4a, which is a perspective view, shows how a wallcovering according to the invention accommodates itself to a bumpy surface, near the edge of a piece of hung wallcovering. FIG. 4b provides a comparison.

Figure 1:
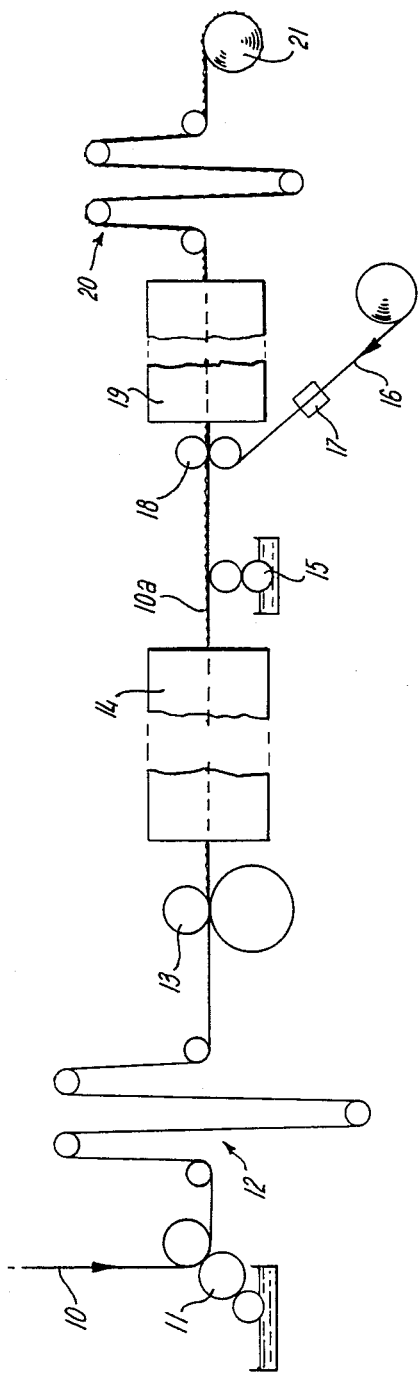

In FIG. 1 a decoratively preprinted bulky wood-free paper web 10 having a weight of 120g/m² is passed through a moistening unit 11 where it is coated with 15g/m² of water. It is allowed to condition for thirty seconds in a unit 12 and is then passed through an embossing nip 13 followed by drying to at or just below ambient in a drier 14 to provide a dried and embossed web 10a. (In an alternative arrangement the web 10 is not preprinted at entry to the apparatus but receives its decorative printing just prior to nip 13, or is left unprinted so that it can be decorated after hanging.) Web 10a then advances to an applicator 15 where a water-insoluble-when-dry laminating adhesive (such as a P.V.A. dispersion) is applied at the rate of 10g/m² to the projecting parts of the emboss.

A corona discharge treated plastics web 16 of twenty micron unfoamed orientated polypropylene is passed through a perforation unit 17 (see examples below for details of perforations) and is then brought into contact with the web 10a at a laminating unit 18 at low contact pressure to avoid damaging the emboss and to give 20-40% contact area with the paper ply. (Perforation after lamination is an alternative and avoids the risk of laminating adhesive penetrating the plastics web.)

The laminate of web 10a and web 16 passes through a drier 19 and a compensator 20 to a piece winding unit 21.

Figure 2A:
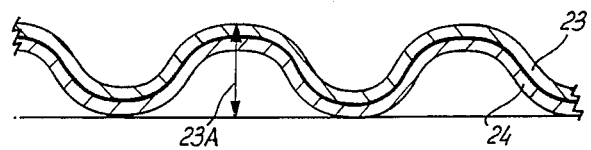

FIG. 2a shows a paste-the-wall wallcovering such as disclosed in E.U. Pat. No. 1,103,458A1. A paper face ply 23 is shown co-embossed with a plastics ply 24. The maximum depth of emboss is represented by arrows 23A.

Figure 2B:
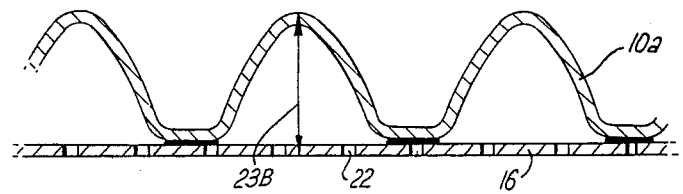

FIG. 2b shows a paper face ply 10a which has been embossed in accordance with the description made with reference to FIG. 1 above and to which has been adhered a flat plastics backing ply 16 having perforations 22. It is to be observed that the depth of the emboss 23B is deeper than the maximum depth of the emboss 23A in FIG. 2a, and that the emboss is retained by the flat ply 16. The emboss 23A is liable to be reduced in reeling, in handling and in hanging until the wallcovering is ultimately dry adhered to a wall. The emboss 23B, on the other hand, is supported by tensile stress in the ply 16.

Figure 3:
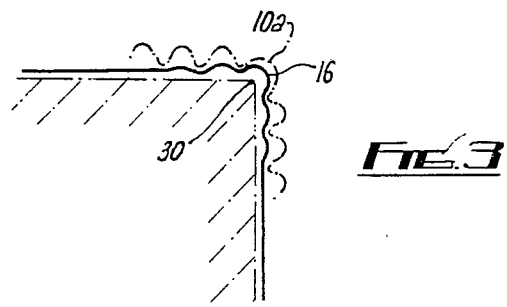

In FIG. 3 wallcovering according to the invention is shown negotiating an external corner 30. The plastics ply 16 is relieved and puckers slightly into the emboss of the paper ply. The embossed paper ply 10a is not unduly stressed or distorted but has flexibility to meet the demands of the corner.

Figure 4A:
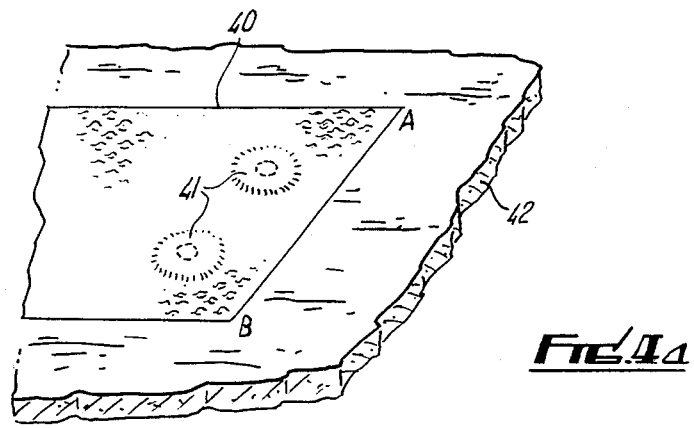

In FIG. 4a, a strip of wallcovering 40 according to the invention is shown hung (as a test) on a substrate 42 having two lumps 41 (formed by wide-headed pins) each of 3 mm height and spaced 40 mm apart to represent a bumpy surface near to the edge A-B of the wallcovering. The strip of wallcovering is able to adjust itself to the lumps 41 so that it adheres to the substrate along the whole length of the edge A-B and, further, the wallcovering can be manipulated during hanging so that the edge A-B is a true straight line so that the strip will abut without gaps to the true edge of an adjacent strip. This manipulation is not due to stretching (as the nature of the wallcovering shown in FIG. 2b is such that loss of pattern match on hanging a five metre length is a mere 2 mm) but is due to slight creasing of the plastics ply 16 in the emboss allowing shrinkage to adjust the dimension of the laminate. Yet further, adherence of wallcovering to substrate occurs between the lumps 41.

Figure 4B:
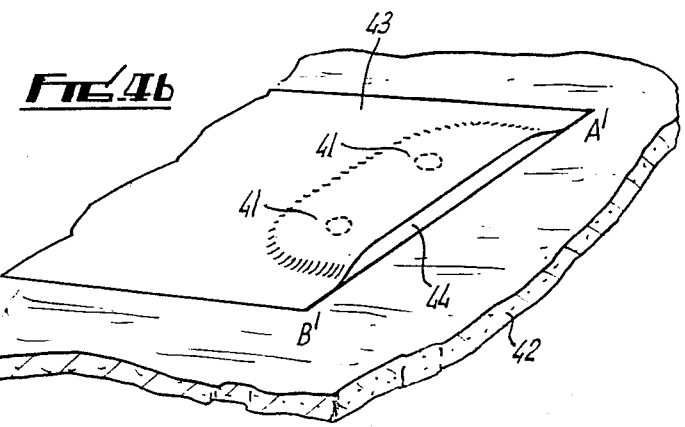

In FIG. 4b an unembossed paper/plastic laminate 43 is hung (as a test) under similar circumstances to that described above with reference to FIG. 4a. It is observed that space 44 arises between the edge A'-B' and the substrate 42 and that there is no adherence between the lumps 41.

Figure 5:
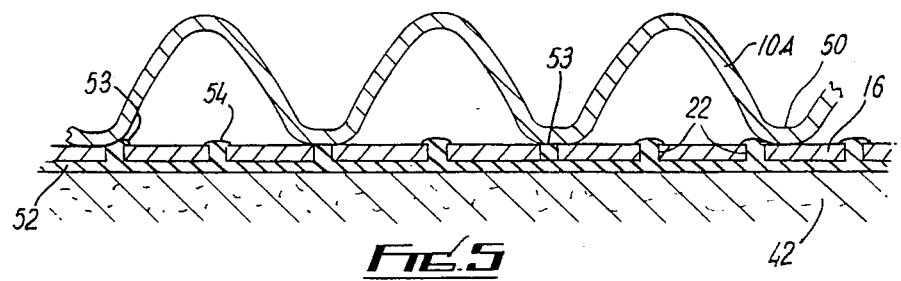
FIG. 5 illustrates a keying effect.

In FIG. 5, a wallcovering according to the invention comprising an embossed paper face ply 10A and a flat plastics ply 16 having perforations 22 is shown adhered to a substrate 42 by an adhesive layer 52 (exaggerated). Where the perforations 22 coincide with or are very close to a valley 50 in the emboss the adhesive comes into contact 53 with the paper. Where the perforations 22 do not coincide with a valley in the emboss a "rivet" head 54 or bead effect is created in the drying paste. Both the paper contact and the rivet heads assure good tacking of the wallcovering to the substrate without hindering the eventual stripping of the wallcovering as a single piece.

Figure 6:
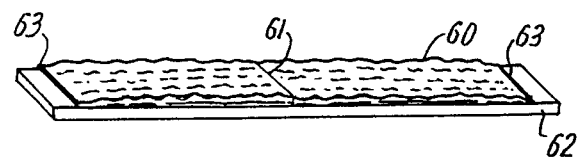
FIG. 6 illustrates test equipment and procedure.

In FIG. 6 there is shown a sample of wallcovering which is 550x150 mm cut in half at the line 61. The two halves are pasted to a glass substrate 62 so that the cut edges abut. The pasting is carried out by applying standard paste at the rate of 300 g/m² to the substrate and then applying the wallcovering. The remote ends of the two halves of the wallcovering are securely located on the substrate by adhesive tape 63.

The mounted sample is weighed and left in controlled standard drying conditions (defined above). After 10 hours the mounted sample is re-weighed to establish percentage weight loss. (To avoid or reduce edge effects in the samples the longitudinal edges of the sample are loosened to prevent edge adhesion dominating the test. Alternatively petroleum jelly could be applied along the longitudinal edges to prevent edge drying when the sample is mounted.)

After re-weighing, the surface of the sample is wetted (as would be encountered with decoration after hanging) and returned to standard drying conditions and observed.

A sample in accordance with the invention will have less than 0.2% shrinkage.

The above test is now illustrated by Examples.

EXAMPLE 1

A sample of laminate was made as described above with reference to FIG. 1 but had unperforated low density polyethylene film as the plastics ply. This prevented moisture transmission to the paper ply but the sample failed to comply with the test for decoration after hanging as when the paper ply was wetted after being set aside to dry for ten hours and then given a further four hours drying at standard conditions, the laminate shrinkage was 0.5%. The polyethylene film was not capable of restraining the paper ply adequately against wet expansion and so the sample tended to cockle and pucker when wetted.

EXAMPLE 2

A sample of laminate was made as described above with reference to FIG. 1 having perforations of 1 mm diameter provided at 4/cm².This complied with the tests for decoration after hanging. The plastics ply restrained the paper ply against wet expansion. The laminate shrinkage on further drying at standard drying conditions, was a mere 0.05% and the weight loss in the first hour of drying was 4%.

EXAMPLE 3

A sample of laminate was made as described above with reference to FIG. 1 having perforations of 1 mm diameter provided at 16/cm$^2$. This complied with the test in respect of the plastics ply being capable of resisting paper ply wet expansion and in respect of the shrinkage on further drying (the shrinkage was zero) but failed to comply in that the weight loss in the first hour of drying was 17%.

EXAMPLE 4

A sample of laminate was made as described above with reference to FIG. 1 having perforations of 1 mm diameter provided 1.5/cm$^2$. This complied with the tests for decoration after hanging. The laminate shrinkage on further drying was 0.15% and the weight loss in the first hour of drying was 5%. The wet expansion criteria of the paper ply was satisfied.

In all the above examples the area of contact between the two plies was in the range of 20-40%.

Wallcovering according to the invention is well suited to serve as a treatment for walls having damp patches. Its application can prevent liquid moisture passage to the extent that the damp patch is inhibited against appearance as a stain on the surface of the wallcovering. It nevertheless allows moisture vapour passage so that the damp dissipates through the wallcovering with low risk of staining and without encouraging fungal growth below the wallcovering when atmospheric conditions allow.

As stated above, it is required that the plastic ply is capable of restraining the paper ply against any significant wet expansion. The result of observing and non-observing this criteria is illustrated by the following further examples:

EXAMPLE 5 (observance)

A decorated wallcovering made according to the description above with reference to FIG. 1 (i.e. having a plastics ply of unfoamed orientated polypropylene) has perforations in the plastics ply of 1 mm diameter and eight perforations per square centimetre. The area of contact between web 10 and web 16 is 30%. The laminate was soaked in water for 10 minutes. There was no change in its width as the plastic ply (web 16) had performed its restraining function. On hanging by paste-the-wall procedures the wallcovering was free from cockling and blisters.

EXAMPLE 6 (non-observance)

A wallcovering was made according to the description above with reference to FIG. 1 except that the web 16 was a twenty micron low density polyethylene. Perforations were as Example 1 above. After a 10 minute water soak the laminate had expanded 0.5% on its width. On paste-the-wall hanging the wallcovering cockled.

Also mentioned above, it is required that the perforations of the plastics ply should not allow, in hanging, for the paper ply to become softened to expose the emboss to damage. The result of observing and nonobserving this criteria is illustrated by the following Examples.

EXAMPLE 7 (observance)

A wallcovering made according to the description above with reference to FIG. 1 has perforations of 1 mm diameter and 1.5 per square centimetre. When applied to an impermeable surface (glass) with 300g/m$^2$ of proprietary starch-ether wallpapering adhesive made up as a 5.5% solution in water the drying rate of the adhesive was shown as follows:
after 30 minutes, 3% moisture loss;
after 60 minutes, 5% moisture loss; and
after 90 minutes, 7% moisture loss; and
after 120 minutes, 9% moisture loss.

EXAMPLE 8 (observance)

As Example 3 but with 1 mm perforations at 4 per square centimetre. The drying rate was shown as follows:
after 30 minutes, 4% moisture loss;
after 60 minutes, 7% moisture loss;
after 90 minutes, 11% moisture loss; and
after 120 minutes, 16% moisture loss.

EXAMPLE 9 (non-observance)

As Example 3 but with sixteen 1 mm diameter perforations per square centimetre. The drying rate was shown as follows:
after 30 minutes, 10% moisture loss;
after 60 minutes, 17% moisture loss;
after 90 minutes, 23% moisture loss; and
after 120 minutes, 30% moisture loss.

Under many practical conditions of hanging, a wallcovering according to Example 9 would give an unsatisfactory result as the paper ply would become excessively wet quickly (5 minutes) after hanging so that the emboss could become easily damaged whereas wallcoverings according to Examples 7 and 8 would give satisfactory results as the paper ply would not become excessively wet after hanging so that the emboss could not be easily damaged.

Perforations in the plastics ply can be of a form such that they act as "tear terminators", that is, they do not set up paths along which tearing could take place when the wallcovering is strained on being stripped from the wall. One convenient way of forming the perforations is by heat fusing the ply so that a minor strengthening rim of fused ply material is set up round each perforation.

There are advantages to be gained in designing the pattern and size of perforations so that there are fewer per unit area near the edges of the wallcovering than at other regions. In this way moistening of the paper ply at the edges of the wallcovering is reduced where it matters most.

We claim:

1. A paste-the-wall wallcovering comprising a paper/plastics laminate in which the paper ply is embossed and the plastics laminate is flat, water-vapour porous, and capable of restraining the paper ply against any significant wet expansion in the course of hanging and drying of the hanging paste.

2. A wallcovering as claimed in claim 1 in which the emboss depth is greater than 0.5 mm, and capable of accommodating irregular corners and lumpy surfaces.

3. A wallcovering as claimed in claim 1 in which the plastics ply is perforated to a degree such that, whilst allowing drying of a hanging paste through the perforations when hung on an impervious pasted surface, does not allow the paper ply to become softened.

4. A wallcovering as claimed in claim 3 in which the perforations are such as to allow no more than 15% weight loss from 300g/m² of hanging paste when applied to a sealed surface within the first hour of drying at standard atmospheric conditions as defined in the foregoing specification.

5. A wallcovering as claimed in claim 3 in which the perforations have a strengthening rim of fused material.

6. A wallcovering as claimed in claim 3 in which the pattern and size of the perforations is such that there are fewer per unit area near the edges of the wallcovering than away from said edges.

7. A wallcovering as claimed in claim 1 which is capable of being hung on a surface by a paste-the-surface procedure and then decorated with a water-based paint at four hours after hanging with an eventual shrinkage of less than 0.2%.

8. A wallcovering in roll form capable of being hung dry to a pasted surface comprising:
   (a) an embossed paper ply, to form the external surface of the wallcovering when hung, and
   (b) Adhered to the paper ply, a plastics ply for contacting said pasted surface;
   characterised in that:
   (i) the plastics ply is flat, and water vapour porous; and
   (ii) The plastics ply is capable of restraining the paper ply against any substantial wet expansion whilst having a vapour porosity such that it does not allow the paper ply to become softened to expose the emboss to damage during the period of hanging.

9. Paste-the-wall wallcovering for decoration after hanging comprising:
   (i) A paper/plastics laminate characterized in that:
   (ii) The paper ply is selected to be able to take an emboss of greater than 0.5 mm depth and is embossed whilst conditioned to be moist and prior to lamination with the plastics ply.
   (iii) The plastics ply is adhered to the embossed paper ply using an adhesive that is water-insoluble after drying and the plastics ply is held nominally flat at the lamination stage to give a flat-backed laminate.
   (iv) The adherence of the plies takes place with the moisture content of the paper ply at or below normal atmospheric level to avoid the paper shrinking on drying with or after the adherence step such as to avoid puckering of the plastics ply to an extent that would inhibit the ability to restrain the paper ply against any significant wet expansion.
   (v) The plastics ply is
   (a) perforated, or otherwise made water vapour porous, such that when, as a test, a sample of the laminate is pasted to a plain glass surface with a standard paste applied to the glass at the rate of 300g/m² and the plastics ply is in contact with the paste and the pasted laminate is set aside to dry under standard conditions then:
      1. the paper ply does not transmit more moisture from the paste than 15% of the paste weight, in the first hour of drying; and
      2. when the paper ply is wetted after being set aside to dry for ten hours under the standard conditions the laminate shrinkage, on further drying, is no more than 0.2%, and
   (b) the plastics ply is capable of restraining the paper ply against wet expansion to not more than 0.2%.

10. A method of forming a paste-the-wall wallcovering as claimed in claim 2 comprising:
    (a) taking a paper web;
    (b) moistening it;
    (c) embossing it;
    (d) drying it to just below ambient humidity; and
    (e) laminating it to a moisture-vapour permeable plastics web with an adhesive that is water-insoluble after drying, the plastics web being flat and capable of restraining the paper web against expansion with negligible stretch of the laminate.

11. A method of covering a surface such as a wall or ceiling comprising pasting the surface and applying strips of dry wallcovering as claimed in claim 1 thereto with the paper ply outermost.

12. A method according to claim 11 in which a part, or parts of, said surface is not truly flat or is an uneven external or internal corner, characterised in that the plastics ply in a strip of wallcovering at the uneven region is allowed to pucker slightly into the emboss of the paper ply without significant effect on the emboss pattern and the strip which is slightly adjusted by said puckering to provide straight line abutment with an adjacent strip.

13. A method as claimed in claim 11 in which the wall-covering is decorated after applying to said surface.

14. A method as claimed in claim 11 in which the paste enters and passes through the porosity of the plastics ply and forms, on drying, a head or bead to aid tacking of the wallcovering to said surface.

15. A wallcovering as claimed in claim 2 in which the embossed depth is greater than 1.5 mm.

16. A wallcovering as claimed in claim 4 in which the maximum said weight loss is no more than 10%.

17. Paste-the-wallcovering as claimed in claim 9 in which the maximum moisture transmission from the paste as specified in (v)(a)1is no more than 10%.

* * * * *